(12) United States Patent
Teh et al.

(10) Patent No.: US 12,621,238 B2
(45) Date of Patent: May 5, 2026

(54) NETWORK-ON-CHIP PACKETIZATION AND ROUTING METHOD AND APPARATUS FOR SCALABLE HIGH-PERFORMANCE NETWORKING ON AND OFF CHIP

(71) Applicant: SKYECHIP SDN BHD, Bayan Lepas (MY)

(72) Inventors: Chee Hak Teh, Bayan Lepas (MY); Yu Ying Ong, Bayan Lepas (MY); Soon Chieh Lim, Bayan Lepas (MY); Weng Li Leow, Bayan Lepas (MY); Yeong Tat Liew, Bayan Lepas (MY); Chuen Heong Khuan, Bayan Lepas (MY); Manobindra Gandhi, Bayan Lepas (MY); Muhamad Aidil Bin Jazmi, Bayan Lepas (MY)

(73) Assignee: SKYECHIP BERHAD, Bayan Lepas (MY)

( * ) Notice: Subject to any disclaimer, the term of this patent is extended or adjusted under 35 U.S.C. 154(b) by 406 days.

(21) Appl. No.: 18/335,062

(22) Filed: Jun. 14, 2023

(65) Prior Publication Data

US 2024/0297846 A1 Sep. 5, 2024

(30) Foreign Application Priority Data

Mar. 1, 2023 (MY) ............................ PI2023001073

(51) Int. Cl.
*H04L 45/00* (2022.01)
*H04L 47/24* (2022.01)
*H04L 49/25* (2022.01)
*H04L 49/9015* (2022.01)

(52) U.S. Cl.
CPC ........ *H04L 45/566* (2013.01); *H04L 47/2458* (2013.01); *H04L 49/25* (2013.01); *H04L 49/9015* (2013.01)

(58) Field of Classification Search
CPC ... H04L 45/566; H04L 47/2458; H04L 49/25; H04L 49/9015
USPC ........................................................ 370/397
See application file for complete search history.

(56) References Cited

U.S. PATENT DOCUMENTS

| | | | |
|---|---|---|---|
| 8,711,867 B2 | 4/2014 | Guo et al. | |
| 2025/0202834 A1* | 6/2025 | Jennings | ............... H04L 45/745 |

OTHER PUBLICATIONS

Kavya, K. et al. ("NOC linked-list based router for Packet Classification Application," International Journal of Engineering Research & Technology (IJERT), vol. 9 Issue 07, Jul. 2020, ISSN: 2278-0181, published by http://www.ijert.org, 5 pages.
(Continued)

*Primary Examiner* — Faisal Choudhury
(74) *Attorney, Agent, or Firm* — ASLAN LAW, P.C.

(57) ABSTRACT

The present invention discloses a computer-implemented method of data transmission for a Network-on-Chip to allow high performance routing through dynamic allocated buffer. The method comprises the steps of transferring command or data in a form of plurality of flits from a source node to a router and further to a destination node, and transmitting the flits from the destination node back to the router, wherein the flits are packetized for transmission according to channel width and transaction width, sequence, and priority routing through physical and virtual channels.

9 Claims, 4 Drawing Sheets

(56)  References Cited

OTHER PUBLICATIONS

Mello, A et al. "Virtual channels in networks on chip: Implementation and evaluation on hermes NOC," 18th Symposium on Integrated Circuits and Systems Design, Pontificia Universidade Cat6lica do Rio Grande do Sul (FACIN-PUCRS), 2005, 6 pages.

Gharan, M.O. and Khan, G.N. "Packet-based adaptive virtual channel configuration for NOC systems," 2014 International Workshop on the Design and Performance of Network on Chip (DPNoC 2014), Procedia Computer Science 34. 2014 Available online at www.sciencedirect.com, 7 pages.

* cited by examiner

Target Node Interface (Ingress)

Case 1          Case 2          Case 3

(A)             (B)             (C)

Case 4          Case 5

(A)             (B)

NETWORK-ON-CHIP PACKETIZATION AND ROUTING METHOD AND APPARATUS FOR SCALABLE HIGH-PERFORMANCE NETWORKING ON AND OFF CHIP

TECHNICAL FIELD

The present invention relates to data transferring which allows scalable high performance networking on and off chip, more particularly to a data transmission packetization and routing in a network-on-chip (NOC).

BACKGROUND ART

Network-on-Chip (NoC) is a new paradigm for System-on-Chip (SoC) design. Increasing integration produces a situation where bus structure, which is commonly used in System-on-Chip, becomes blocked and increased capacitance that poses physical problems. Hence, the traditional data transferring method via bus architecture is replaced in Network-on-Chip architecture for improving the system performance, whereby data communications between segments of chip are packetized and transferred through the network. The network consists of wires and routers. Processors, memories and other IP-blocks (Intellectual Property) are connected to routers. A routing algorithm plays a significant role on network's operation. Routers make the routing decisions based on the routing algorithm.

Although Network-on-Chip has been widely used to improve the data network performance particularly solving data latency and/or congestion problem, it still suffers from some issues and drawbacks especially blocked traffic due to incapability to prioritize packetized data in router algorithm. This occurrence will then result in a slower data transferring.

There have been a number of solutions provided for data transferring for Network-on-Chip in which few of them are discussed below:

U.S. Pat. No. 8,711,867B2 disclosed a method which includes receiving flits forwarded from an upstream router into a first input virtual channel (VC) associated with an input port. The flits are associated with packets originated from a first Intellectual Property (IP) core and forwarded to a second IP core. The flits are stored in a VC storage associated with the first input VC. The method further includes performing link width conversion based on a width of the flits being different from a width of an output port. Link width conversion includes accumulation of the flits when the width of the output port is wider and unpacking of the flits when the width of the output port is narrower. Credits are generated based on the flits being forwarded from the first input VC to the output port. The credits are sent to the upstream router to enable receiving more flits from the upstream router.

Kavya K. study Network on chip (NoC) linked-list based router for packet classification application where the transactions need to be restored within the time frame (Kavya, K. (2020) "NOC linked-list based router for Packet Classification Application," International Journal of Engineering Research and, V9(07). Available at: https://doi.org/10.17577/ijertv9is070295). NoC includes virtual channels to improve the performance of the NoC System. When there are multiple transactions, they share the same physical layer and each virtual channel needs a first-in, first-out (FIFO) and every virtual channel is not used every time, so there is no effective utilization. This leads to complexity in software. This study provides a solution to overcome the complexity issue; however the study did not clearly discuss the mechanism of the flit assembler or flit splitter which contributes to the speed of data transmission.

Mello, A et. al. study implementation of a mechanism to reduce performance penalization due to packet concurrence for network resources in Networks on chip (NoC). NoC draws on concepts inherited from distributed systems and computer networks subject areas to interconnect IP cores in a structured and scalable way (Mello, A. et al. (2005) "Virtual channels in networks on chip: Implementation and evaluation on hermes NOC," 2005 18th Symposium on Integrated Circuits and Systems Design [Preprint]. Available at: https://doi.org/10.1109/sbcci.2005.4286853). Congestion in NoC reduces the overall system performance. This effect is particularly strong in networks where a single buffer is associated with each input channel, which simplifies router design, but prevents packets from sharing a physical channel at any given instant of time.

The growing number of on-chip cores requires the introduction of an efficient communication structure such as NoC (Gharan, M. O. and Khan, G. N. (2014) "Packet-based adaptive virtual channel configuration for NOC systems," Procedia Computer Science, 34. Available at: https://doi.org/10.1016/j.procs.2014.07.069). In NoC design, the channel buffer organization facilitates the use of Virtual Channels (VC) for on-chip communication. A VC structure can be categorized as static or dynamic. In a dynamic VC structure, variable numbers of buffer-slots can be employed by each VC according to different traffic conditions in the NoC.

Nevertheless, the references described above and other existing techniques still suffer from a number of problems of which the objectives and features of the present invention attempts to address. For example, industries such as computer architecture dealing with wide interfaces which packetize and transfer data by narrower interfaces can cause slow data transferring. Moreover, prioritization routing is also an issue showing that the packetization and routing are still far from advanced. Therefore, it can be seen that there is a need to provide a solution specially to overcome the stated problem that enables more efficient working inference system and algorithm.

SUMMARY OF THE INVENTION

The following presents a simplified summary of the invention in order to provide a basic understanding of some aspects of the invention. This summary is not an extensive overview of the invention. Its sole purpose is to present some concepts of the invention in a simplified form as a prelude to the more detailed description that is presented later.

It is an objective of the present invention to provide a computer-implemented method of data transmission for a Network-on-Chip to allow high performance routing through dynamic allocated buffer.

A further objective of the present invention is enabling virtually independent channels to be formed using the same physical resources.

It is also an objective of the present invention for virtual channels to be used to differentiate between levels of priorities or dedicated to specific requester or subordinate.

Another objective of the present invention is to provide a way to maintain flits sequence when flits are going in the same direction.

Additionally, another objective of the present invention is to provide a method of packetization on the Network-on-Chip based on data width from user interface to physical channel width.

It is further an objective of the present invention to provide a method of transmitting flits from the router to the destination node in multiple cycles through flit assembler for ingress data transmission and flit splitter for egress data transmission.

Furthermore, another objective of the present invention is to provide a method of priority routing in routing flits with different priority levels, wherein elevation of priority is aided by linked-list managed flit buffer.

Accordingly, these objectives may be achieved by following the teachings of the present invention. The present invention relates to a computer-implemented method of data transmission for a Network-on-Chip to allow high performance routing. The said method comprises the steps of: transferring command or data in a form of a plurality of flits from a source node to a router through one or more physical channels; transmitting the flits from the router to a destination node through one or more physical channels by: distributing the flits to a plurality of virtual channel First In First Out (FIFOs), multiplexing the flits in the virtual channel FIFOs for entering the destination node, spanning the flits into multiple flits if the physical channel that the virtual channel resides in has a channel width that is less than the transaction flit width, and incrementing the multiple flits until the end-of-packet before passing on to the next FIFO to a downstream destination node; transmitting the flits from the destination node to the router through one or more physical channels by: splitting the flits into multiple cycles based on the width of the physical channel that the flits are mapped to, sending the flits according to the multiple cycles to the virtual channel, selecting the virtual channel for sending the flits to the router via the physical channel; wherein determining the flit transmission sequence by linked-list management and priority routing.

The present invention also relates to a Network-on-Chip data transmission apparatus which comprises a source node, a destination node, a router connected to the source node and the destination node, a plurality of physical channels disposed between the source node and the router, and between the router and the destination node, wherein each of the physical channels having a multiple virtual channel, a multiplexer, an arbiter connected to the multiplexer; characterised by a flit assembler for ingress data transmission or/and a flit splitter for egress data transmission, and a dynamically allocated buffer comprising a link-list manager within the router.

The present invention further relates to an apparatus for data transmission for a Network-on-Chip, which comprises a processor; and a non-transitory computer readable medium which consists of computer-executable instructions that, when executed by the processor, cause the apparatus to perform the method of the present invention.

The foregoing and other objects, features, aspects and advantages of the present invention will become better understood from a careful reading of a detailed description provided herein below with appropriate reference to the accompanying drawings.

BRIEF DESCRIPTION OF THE ACCOMPANYING DRAWING

So that the manner which the above recited features of the present invention can be understood in detail, a more particular description of the invention, briefly summarized above, may have been referred by embodiments, some of which are illustrated in the appended drawings. It is to be noted, however, that the appended drawings illustrate only typical embodiments of this invention and are therefore not to be considered limiting of its scope, for the invention may admit to other equally effective embodiments.

These and other features, benefits, and advantages of the present invention will become apparent by reference to the following text figure, with like reference numbers referring to like structures across the views, wherein.

DETAILED DESCRIPTION OF THE PREFERRED EMBODIMENTS

Figure 1:
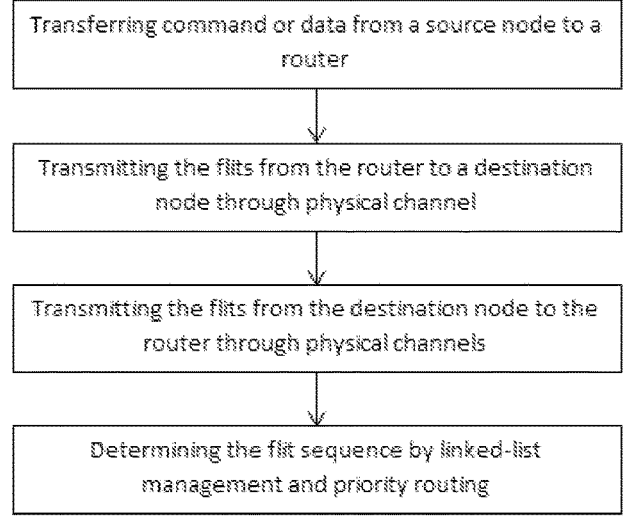
FIG. 1 is a process flowchart illustrating a computer-implemented method of data transmission for a Network-on-Chip in accordance with an embodiment of the present invention.

While the present invention is described herein by way of example using embodiments and illustrative drawings, those skilled in the art will recognize that the invention is not limited to the embodiments of drawing or drawings described, and are not intended to represent the scale of the various components. Further, some components that may form a part of the invention may not be illustrated in certain figures, for ease of illustration, and such omissions do not limit the embodiments outlined in any way. It should be understood that the drawings and detailed descriptions are not intended to limit the invention to the particular form disclosed, but on the contrary, the invention is to cover all modifications, equivalents, and alternatives falling within the scope of the present invention as defined by the appended claims. As used throughout this description, the word "may" is used in a permissive sense (i.e. meaning having the potential to), rather than the mandatory sense, (i.e. meaning must). Further, the words "a" or "an" mean "at least one" and the word "plurality" means "one or more" unless otherwise mentioned. Furthermore, the terminology and phraseology used herein are solely used for descriptive purposes and should not be construed as limiting in scope. Language such as "including," "comprising," "having," "containing," or "involving," and variations thereof, is intended to be broad and encompasses the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Any discussion of documents, acts, materials, devices, articles and the like is included in the specification solely for the purpose of providing a context for the present invention. It is not suggested or represented that any or all of these matters form part of the prior art base or were common general knowledge in the field relevant to the present invention.

In this disclosure, whenever a composition or an element or a group of elements is preceded with the transitional phrase "comprising", it is be understood that we also contemplate the same composition, element or group of elements with transitional phrases "consisting of", "consisting", "selected from the group of consisting of, "including", or "is" preceding the recitation of the composition, element or group of elements and vice versa.

The present invention is described hereinafter by various embodiments with reference to the accompanying drawing, wherein reference numerals used in the accompanying drawing correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only and are not intended to limit the scope of the claims. In addition, a number of materials are identified as suitable for various facets of the implementations. These materials are to be treated as exemplary and are not intended to limit the scope of the invention.

Referring to the drawing as shown in FIGS. 1 to 8, the present invention will now be described in more detail.

The present invention relates to a computer-implemented method of data transmission for a Network-on-Chip (NOC). More particularly, a NOC packetization and routing method that allows scalable high-performance networking on and off chip.

The computer-implemented method of high performance routing in a Network-on-Chip in data transmission packetization, is characterized by the steps of: transferring command or data in a form of plurality of flits from a source node to a router through one or more physical channels; transmitting the flits from the router to a destination node through one or more physical channels by distributing the flits to a plurality of virtual channel First In First Out (FIFOs), multiplexing the flits in the virtual channel FIFOs for entering the destination node, spanning the flits into multiple flits if the physical channel that the virtual channel resides in has a channel width that is less than the transaction flit width, and incrementing the multiple flits until the end-of-packet before passing on to the next FIFO to the downstream destination node; transmitting the flits from the destination node to the router through one or more physical channels by splitting the flits into a multiple cycles based on the width of the physical channel that the flits are mapped to, sending the flits according to the multiple cycles to the virtual channel, selecting the virtual channel for sending the flits to the router via the physical channel, wherein determining the flit sequence by linked-list management and priority routing.

In accordance with an embodiment of the present invention, the flits are distributed to the plurality of virtual channel First In First Out (FIFOs) based on each virtual channel FIFOs credit indication. For instance, each virtual channel FIFO returns a credit indication to the router. Depending on the number of credits it receives, the router will decide whether it can send a flit across the physical channel to a virtual channel FIFO.

In accordance with an embodiment of the present invention, the interface protocol could be any protocol as long as it can be packetized. Packetization is done based on data width from the user interface to physical channel width on the Network-on-Chip.

In accordance with an embodiment of the present invention, the source node is connected to the router through physical channel, wherein physical channel could be more than one channels allowing simultaneous transfers at one time. The content of the channels is application-specific depending on the protocol being used.

In accordance with an embodiment of the present invention, virtual channel exists allowing further segregation of traffic within a channel to enhance the performance of the physical channels. Virtual channel does not require additional hardware on the channels itself but implemented as parameterized hardware on the source node and the router.

In accordance with an embodiment of the present invention, router transmits the flits to the destination node through one or more physical channels wherein a physical channel may have a variable number of virtual channels. Flits are distributed to the virtual channel FIFOs that they are targeted at when they arrive at the interface of the destination node.

Figure 2:
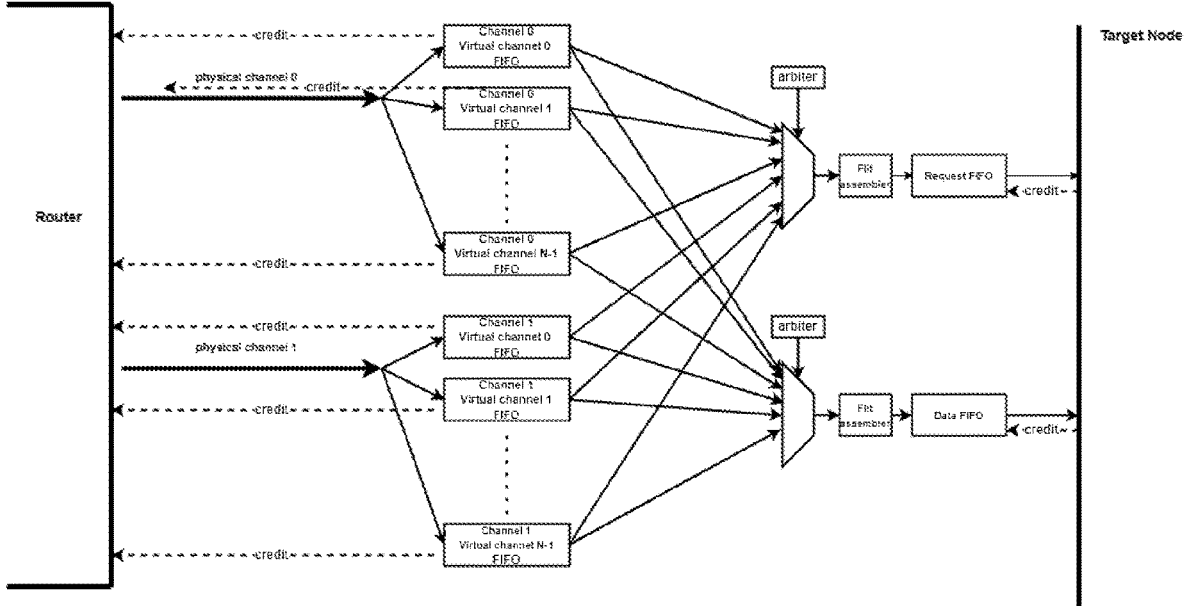
FIG. 2 illustrates a target node interface from a router to a destination node for an ingress direction in accordance with an embodiment of the present invention.

In accordance with an embodiment of the present invention, there are request flits and data flits in the ingress direction at the destination node, wherein the request flits could enter the destination node from any of the virtual channels in each of the physical channels, and then enqueued into the request FIFO in the destination node. Similarly, the data flits could enter the destination node from any of the virtual channels in each of the physical channels as well, and then enqueued into the data FIFO in the destination node, as illustrated in FIG. 2.

In accordance to one of the embodiments, the virtual channels FIFOs are multiplexed for the request flits or data flits entering the destination node. The multiplex selection is controlled by arbitration via an arbiter.

In accordance to one of the embodiments, the arbiter can be round robin, weighted round robin, or any other priority-based scheme wherein the arbiter will grant and allow only one of the virtual channels at a time. Once a virtual channel is granted, the grant is kept on the virtual channel until end-of-packet is asserted by the virtual channel.

In accordance to one of the embodiments, the flits span into multiple flits if the physical channel that the virtual channel resides in has a channel width that is less than the transaction flit width, and incrementing the multiple flits until the end-of-packet before passing on to the next FIFO to the downstream destination node if credits of request FIFO or data FIFO is sufficient.

In accordance with the embodiment of present invention, a multiple flit is deserialized based on the incoming virtual channel's width. The deserialization is carried out by a flit-assembler.

Figure 4:
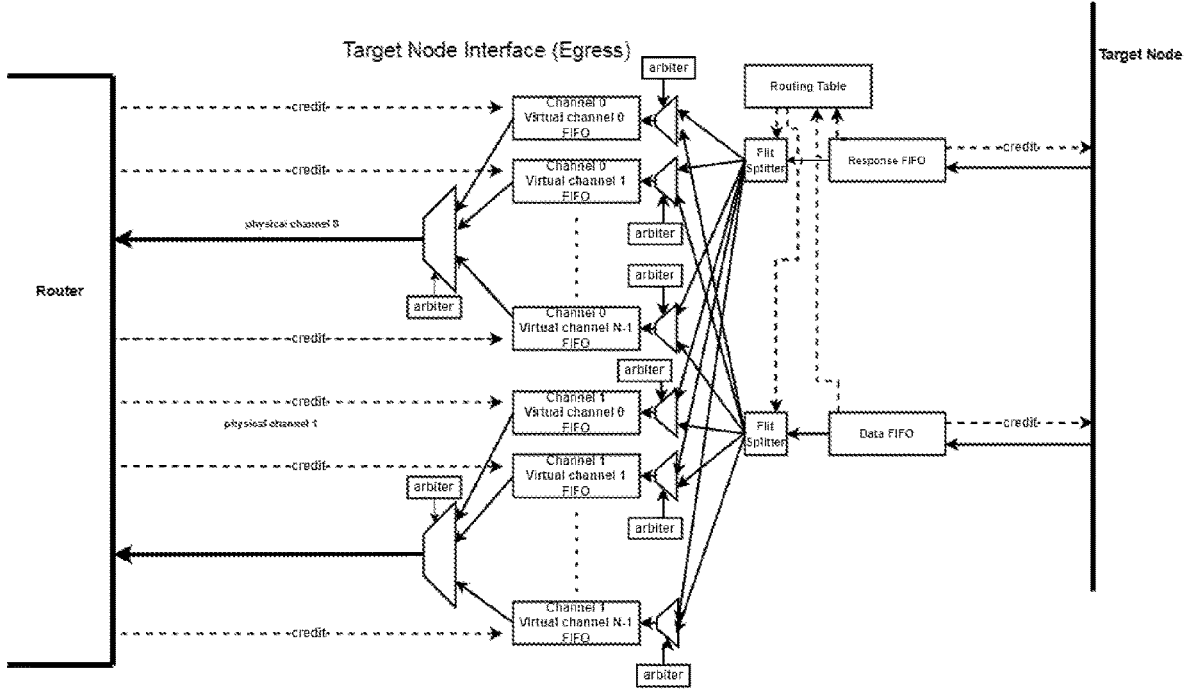
FIG. 4 illustrates the target node interface from the destination node to the router for an egress direction in accordance with an embodiment of the present invention.

In accordance with an embodiment of the present invention, the flits are transmitted from the destination node to the router through one or more physical channels. There are two flit types comprises response flit and data flit in the egress direction, wherein both flits enter the FIFO at the destination node interface. The head of FIFO is dequeued and split into multiple cycles based on the width of the physical channel that the flits are mapped to. The destination ID is submitted to the Routing Info to get the mapping of ID to physical channel and virtual channel, as illustrated in FIG. 4. The flits are then sent according to the multiple cycles to the virtual channel.

In accordance with an embodiment of the present invention, the virtual channel is selected by multiplexing to choose flits before they are sent to the next stage. The selection of virtual channel by multiplexing is controlled by an arbiter, wherein the arbiter can be round robin, weighted round robin or other priority-based scheme.

In accordance with an embodiment of the present invention, a second level arbiter is required to select one out of all virtual channels to send the flits to the router via a physical channel as the multiple virtual channels of the same physical channel will compete for the physical channel.

In accordance with an embodiment of the present invention, the method further comprises generating variables by a linked-list manager to determine destination of the flits before transmitting the flits from the router to the destination node. The generation of variables creates a sequence of the flits. More particularly, the router comprises a dynamically allocated flit buffer managed by a linked-list manager. The dynamically allocated flit buffer utilizes linked-list method inside the router to managed flits sequence and priority routing.

In accordance with an embodiment of the present invention, the linked-list manager manages the sequence of flits in the dynamically allocated flit buffer by dependency-checking logic. The dynamically allocated flit buffer stores flit in registers and they are linked to each other with linked-list to retain the sequence of flits being transmitted. For instance, when two linked-lists are generated for different routers, only flits that are at the head of the linked-list will be requesting. The dynamic allocation of buffer with linked-list effectively creates two deep FIFOs in parallel to each for their respective router link. Each flit buffer contains payload, destination and ordering information generated by the linked-list manager. In the linked-list managed flit buffer, the destination is decoded up front so that linked-list manager can determine the flit destination and create the link between the buffers. The linked-list managed flit buffer consists of a few flit buffers which quantity is configurable. The flit buffers consist variables in each for indicating its status and dependency. When the variables are set by the linked-list manager, a link will be created forming the desired flit sequence. Granted flit will be removed from the flit buffer and the next flit in line will be at the head of the linked-list.

In accordance with an embodiment of the present invention, linked-list managed flit buffer aids in routing flits with different priority level. When there is a higher priority flit intended for the same destination is added into the link, linked-list manager will elevate the priority of all the flits ahead of it to the same priority level.

The present invention further relates to a NOC data transmission apparatus which comprises a source node, a destination node, a router connecting the source node and the destination node, a plurality of physical channels disposed between the source node and the router, and between the router and the destination node, a multiplexer, an arbiter connected to the multiplexer, characterized by a flit assembler for ingress data transmission and a flit splitter for egress data transmission, and a dynamically allocated flit buffer comprises a linked-list manager. Each of the physical channel further comprises a multiple virtual channel to improve the system performance. Said apparatus is able to transmit data as per the method of the present invention.

The present invention also relates to an apparatus for data transmission for a NOC which comprises a processor and a non-transitory computer readable medium comprising computer-executable instructions that, when executed by the processor, cause the apparatus to perform the method of the present invention.

Hereinafter, example of the present invention will be provided for more detailed explanation. The advantages of the present invention may be more readily understood and put into practical effect from these examples. However, it is to be understood that the following examples are not intended to limit the scope of the present invention in any way.

EXAMPLE

Example 1: Multiple Flits Span

FIG. 2 illustrates a physical channel that the virtual channel resides in has a channel width that is less than the transaction flit width, which it is expected that the request will span multiple flits. For example, there are three physical channels, with physical channel 0 32-bit, physical channel 1 64-bit and physical channel 2 128-bit. If a data transaction requires a 96-bit flit, then the transaction coming in through any of the virtual channel in physical channel 0 will require three cycles to complete, with each cycle transferring 32-bit data and with the end of packet asserted on the last or third cycle. If the transaction is coming in through any of the virtual channel in physical channel 1, it will require 2 cycles to complete, with each cycle transferring 64-bit of data and the EOP (end of packet) asserted on the 2nd cycle. Likewise if the transaction is coming in through any of the Virtual Channels in physical channel 2, it only requires a single cycle.

Figure 3:
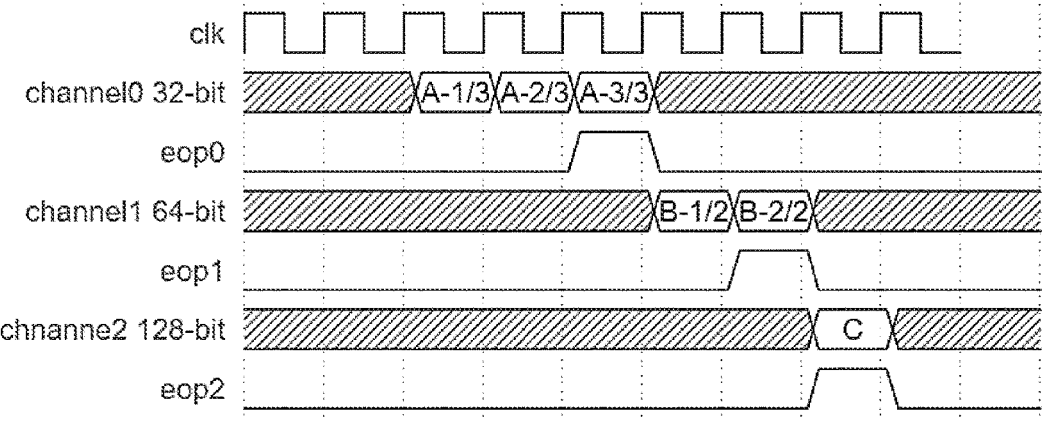
FIG. 3 illustrates an example of span of multiple flits if the physical channel that the virtual channel resides in has a channel width that is less than the transaction flit width.

FIG. 3 illustrates the multiple flits based on the incoming virtual channel's width. A flit-assembler will deserialize the multiple flits according to the width of the incoming virtual channel. As the least significant bit (LSB) is received first, the following structure will deserialize the incoming byte stream. The write pointer will increment by the amount equal to the physical channel width on every cycle until it sees the end-of-packet asserted and the re-assembled full flit is then passed on the next FIFO. The next FIFO could be the request FIFO or the data FIFO depending on the flit type, which will then transmit the full request flit or data flit to the downstream destination node. For Coherent Hub Interface protocol, the destination node will transmit credits to the request FIFO or data FIFO so that the request flit or data flit is only sent downstream if it has sufficient credits.

Example 2: Transmitting Flits from the Destination Node to the Router

A response flit with destination ID of 000 could be mapped to physical channel 0 virtual channel 1, while a data flit with destination ID of 001 could be mapped to physical channel 1 virtual channel 2. Hence, it is possible that a response or data flit can be mapped to any of the virtual channels in any of the physical channel.

Figure 5:
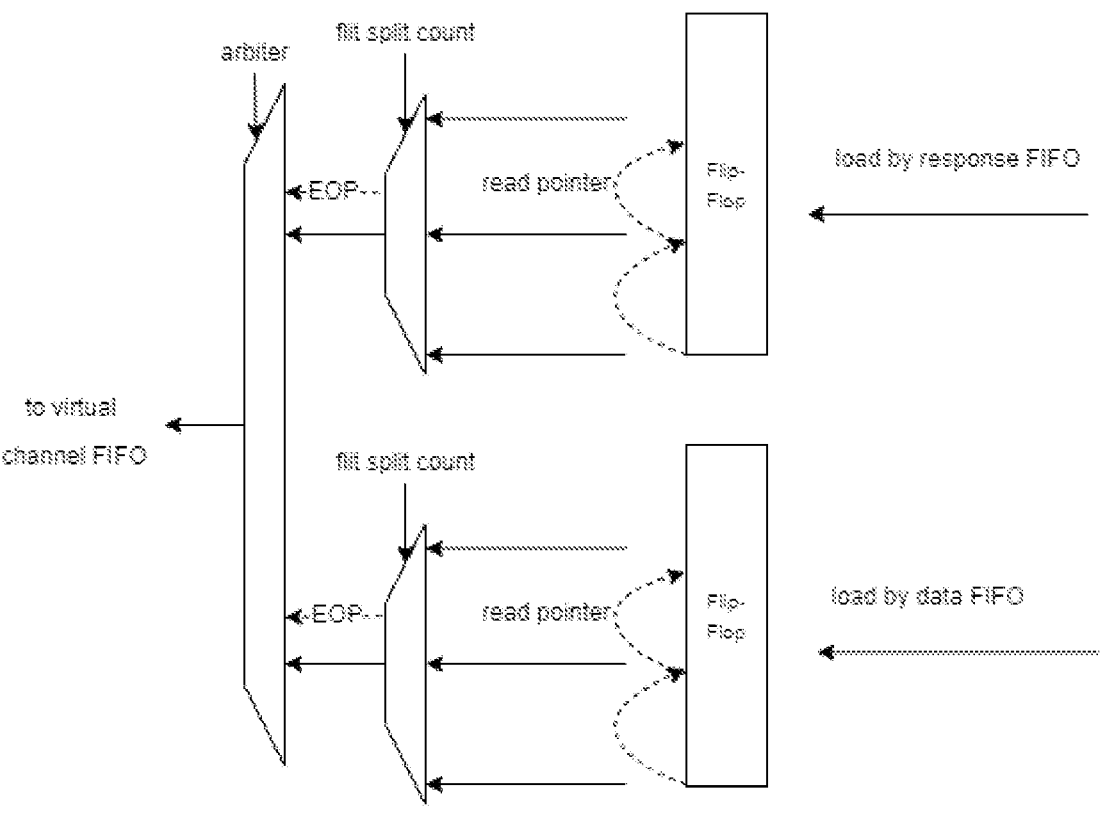
FIG. 5 illustrates a second stage of arbiter from the destination node to the router in accordance with an embodiment of the present invention.

FIG. 4 illustrates the target node interface from the destination node to the router for an egress direction. For example, if a data flit with destination ID 001 is mapped to physical channel 0 virtual channel 3, and the full data flit is 128-bit but the physical channel 0 is only 32-bit, then the flit splitter will shift out 32-bit from the data flit, once per cycle, LSB first, and send to physical channel 0 virtual channel 3. The end-of-packet is asserted on the $4^{th}$ or last cycle, as illustrated in FIG. 5.

Example 3: Multiplexer and Arbiter

It is possible that both the request flit and the data flit could be targeting the same physical channel and virtual channel, thus a 2:1 multiplexer with an arbiter is needed to select which one to send it to the next stage. Once a grant is given, it stays on the same request flit or data flit until end-of-packet is asserted.

Example 4: Dynamically Allocated Flit Buffer

Figure 6:
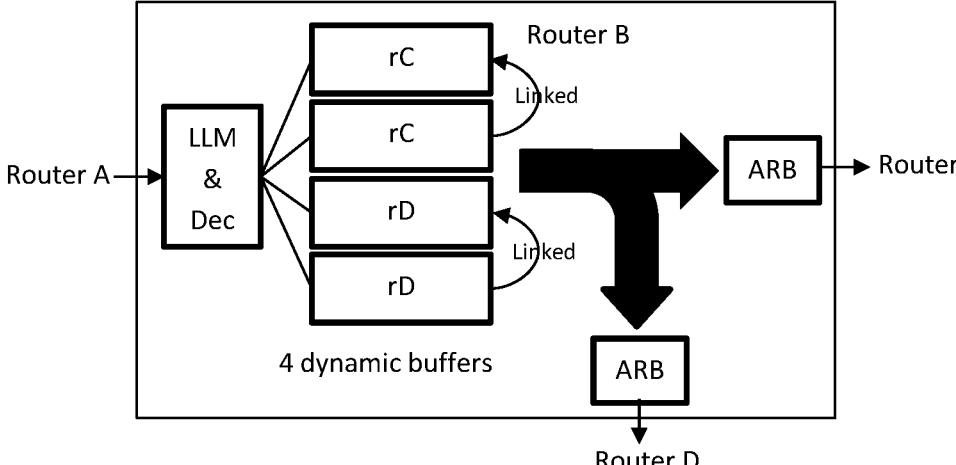
FIG. 6 illustrates a router consisting of a dynamically allocated flit buffer that is linked-to each other with linked-list.

FIG. 6 illustrates a dynamically allocated flit buffer that stores flit in registers and they are linked to each other with linked-list. This is necessary to retain the sequence of flits being transmitted. FIG. 6 illustrates two linked-lists are generated, one for router D and another for router C. Only flits that are at the head of the linked-list will be requesting. The dynamic allocation of buffer with linked-list effectively created two two-deep FIFOs in parallel to each for their respective router link. With the scenario above, flits to router C can still progress even though router D is not accepting any flits, thus improving Network-on-Chip throughput.

Example 5: Linked-List Managed Flit Buffer

Flit buffer forms the sequence of flit which is managed by the dependency-checking logic called linked-list manager (LLM). Each flit buffer contains the payload, destination and ordering information generated by LLM. In linked-list managed flit buffer, the destination is decoded up front so that LLM can determine the flit destination and create the link between the buffers. Table 1 below lists some of the data stored in a flit buffer.

TABLE 1

| Linked-list variables | |
| --- | --- |
| Name | Description |
| Valid | Indicates whether a flit buffer is populated |
| Payload | Data to be transmitted |
| Priority | Flit priority |
| HOL | Head of list indicator |
| TOL | Tail of list indicator |
| Dependency | Stores the flit buffer ID of the prior flit in the linked-list |
| Destination | Destination router after decoding |

Figure 7:
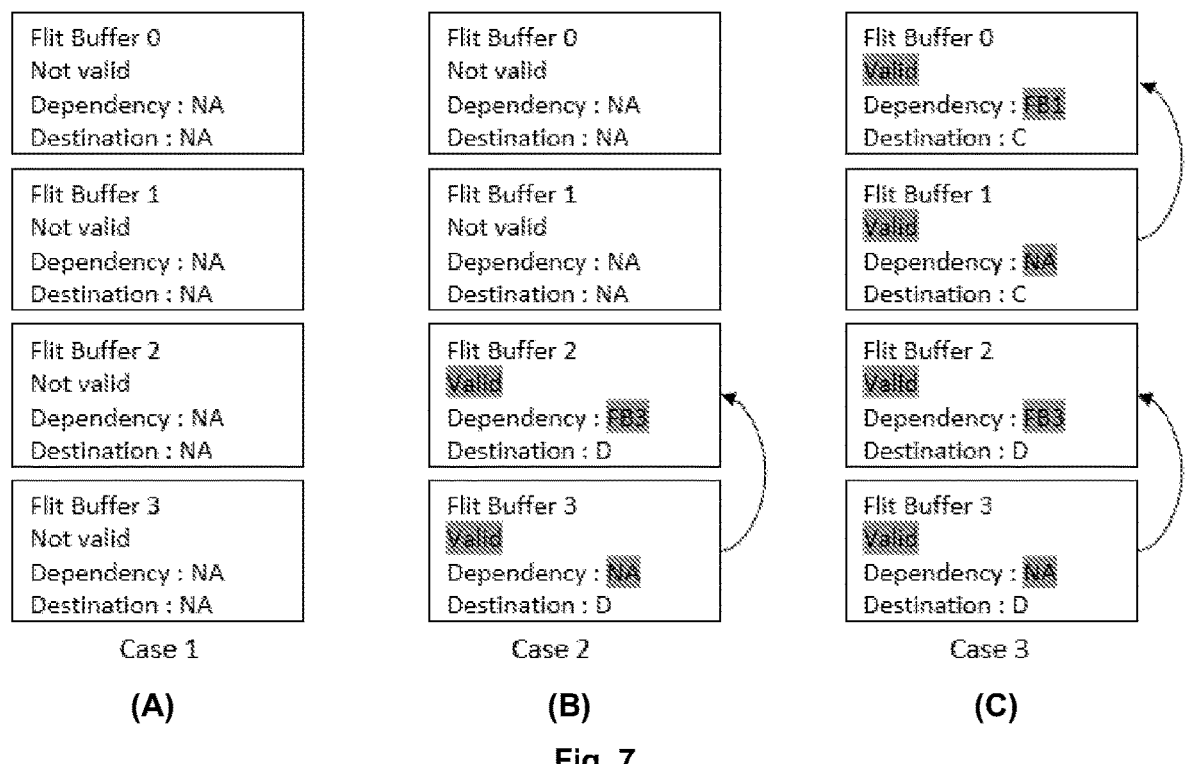
FIG. 7 illustrates an example of linked-list managed flit buffer having flit buffers which quantity is configurable through a parameter.
Figure 8:
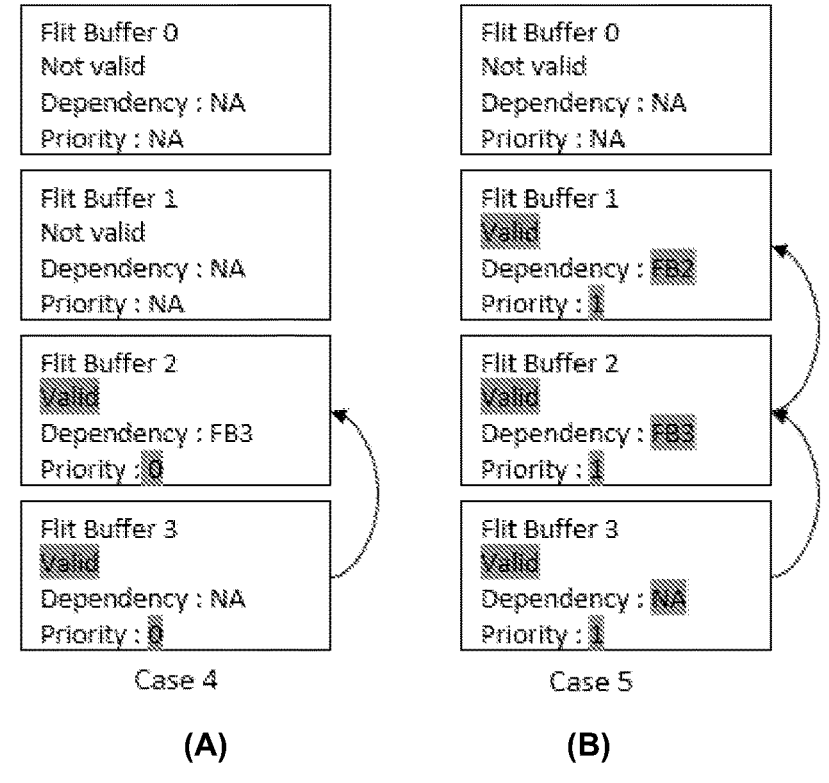
FIG. 8 Illustrates an example of priority routing in flit buffers of a linked-list managed flit buffer.

FIG. 7 illustrates the linked-list managed flit buffer consists of a few flit buffers which quantity is configurable through a parameter. In these cases, we are looking at four flit buffers with a few variables in each indicating its status and dependency. When the variables are set by the LLM, a link will be created forming the desired flit sequence.

Case 1: Illustrated in FIG. 7A, the variables are set upon reset or the flit buffers are empty. Flit can be loaded into any of the empty flit buffer making the placement dynamic.

Case 2: Illustrated in FIG. 7B, one linked-list is present and occupying two out of four flit buffers. Loaded flit buffer without dependency would be at the head in the link (HOL=1) and would be requesting to its destination arbiter. The TOL indicates the tail of the list and is used by incoming flit to set its dependency on.

Case 3: Illustrated in FIG. 7C, two linked-lists are present in the flit buffers. In addition to flits already present previously, there are two more flits going to router C. There are two valid flits requesting in this case.

Granted flit would be removed from the flit buffer and the next flit in line would now be at the head of the linked-list.

Example 6: Priority Routing

There are two flits in the flit buffer going to the same destination at priority level of 0 which is the lowest priority.

Case 4: LLM sets the flit buffer into a linked-list as depicted in FIG. 8A.

Case 5: when a higher priority flit intended for the same destination is added into the link, LLM elevates the priority level of all the flits ahead of it to the same priority level as depicted in FIG. 8B.

This would ensure Network-on-Chip quality of service policy is adhered to.

The present invention overcomes the shortcoming of the prior arts by providing packetization and routing method for Network-on-Chip to allow scalable high performance networking on and off chip used in networking. The packetization process in present invention helps to improve data latency and speed by implying dynamically allocated flit buffer and usage of virtual channels making wider interfaces (data width) packetized and transferred by narrower interface at higher speed. On the other hand, routing method which is dynamically allocated buffer that implies in this present invention forms a linked list to maintain sequence when flits are going to the same direction and allowing higher priority to advance earlier.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claim.

The invention claimed is:

1. A computer-implemented method of data transmission for a Network-on-Chip, characterized in that said method comprises the steps of:

transferring command or data in a form of a plurality of flits from a source node to a router through one or more physical channels;

transmitting the flits from the router to a destination node through one or more physical channels by:

distributing the flits to a plurality of virtual channel First In First Out (FIFOs);

multiplexing the virtual channel FIFOs for flits entering the destination node;

spanning the flits into multiple flits if the physical channel that the virtual channel resides in has a channel width that is less than the transaction flit width, and incrementing the multiple flits until the end-of-packet before passing on to the next FIFO to a downstream destination node;

transmitting the flits from the destination node to the router through one or more physical channels by:

splitting the flits into multiple cycles based on the width of the physical channel that the flits are mapped to;

sending the flits according to the multiple cycles to the virtual channel;

selecting the virtual channel for sending the flits to the router via the physical channel;

wherein determining the flit sequence by linked-list management and priority routing.

2. The computer-implemented method as claimed in claim 1, wherein distributing the flits to the plurality of virtual channel First In First Out (FIFOs) based on each virtual channel FIFOs credit indication.

3. The computer-implemented method as claimed in claim 1, wherein the flits from the router to the destination node is transmitted as a request flit or a data flit.

4. The computer-implemented method as claimed in claim 1, wherein the flits from the destination node to the router is transmitted as a response flit or a data flit.

5. The computer-implemented method as claimed in claim 1, wherein selecting the virtual channel by arbitration for sending the flits to the router via the physical channel.

6. The computer-implemented method as claimed in claim 1, wherein the method further comprises generating variables by a linked-list manager to determine destination of the flits before transmitting the flits from the router to the destination node.

7. The computer-implemented method as claimed in claim 6, wherein creating a sequence of the flits forming a linked-list once the variables are generated.

8. The computer-implemented method as claimed in claim 1, wherein the priority routing comprising priority elevation of the flits in a linked-list when a higher priority flit is enqueued into the linked-list.

9. An apparatus for data transmission for a Network-on-Chip, comprising:

a processor; and a non-transitory computer readable medium comprising computer-executable instructions that, when executed by the processor, cause the apparatus to perform the method as claimed in claim 1.

* * * * *